US010230675B2

(12) United States Patent
Mahood et al.

(10) Patent No.: US 10,230,675 B2
(45) Date of Patent: Mar. 12, 2019

(54) DERIVING ATOMIC COMMUNICATION THREADS FROM INDEPENDENTLY ADDRESSABLE MESSAGES

(71) Applicant: Microsoft Technology Licensing, LLC, Redmond, WA (US)

(72) Inventors: Justin B. Mahood, Seattle, WA (US); Ryan Gregg, Seattle, WA (US); Tali Roth, Kirkland, WA (US); Giselli Panontini DeSouza Sana, Redmond, WA (US); Linda Chen, Redmond, WA (US); Rajesh Ramanathan, Redmond, WA (US); Rafael Ferreira Barcelos, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 364 days.

(21) Appl. No.: 14/162,125

(22) Filed: Jan. 23, 2014

(65) Prior Publication Data
US 2015/0207768 A1 Jul. 23, 2015

(51) Int. Cl.
*H04L 12/58* (2006.01)
*G06F 15/16* (2006.01)

(52) U.S. Cl.
CPC .............. *H04L 51/16* (2013.01); *H04L 51/00* (2013.01); *G06F 15/16* (2013.01)

(58) Field of Classification Search
None
See application file for complete search history.

(56) References Cited

U.S. PATENT DOCUMENTS

| 7,103,634 | B1 | 9/2006 | Ullmann et al. |
| 7,222,299 | B1 | 5/2007 | Lim et al. |
| 7,395,315 | B2 | 7/2008 | Colson et al. |
| 7,506,263 | B1 | 3/2009 | Johnston et al. |
| 7,921,176 | B2 | 4/2011 | Madnani |
| 8,185,482 | B2 | 5/2012 | Yang et al. |
| 8,332,477 | B1 | 12/2012 | Kaiserlian et al. |
| 8,645,430 | B2 | 2/2014 | Khouri et al. |
| 8,780,703 | B1 * | 7/2014 | Eidelson ................. H04L 51/32 370/228 |
| 9,043,411 | B2 | 5/2015 | Claux et al. |

(Continued)

FOREIGN PATENT DOCUMENTS

| CN | 101090409 A | 12/2007 |
| CN | 102273234 A | 12/2011 |
| WO | WO 2006083820 A2 | 8/2006 |

OTHER PUBLICATIONS

International Preliminary Report on Patentability for International Application No. PCT/US2015/012326 dated Nov. 6, 2015, 13 pages.

(Continued)

*Primary Examiner* — Viet D Vu
*Assistant Examiner* — James A Edwards
(74) *Attorney, Agent, or Firm* — Christopher J. Volkmann; Kelly, Holt & Christenson, PLLC

(57) ABSTRACT

When a message is received, the recipient set in the message, as well as ancestor message identifiers, are analyzed. The received message is either placed in an existing thread in an existing conversation, or in a new thread in the conversation, based upon the analysis of the recipient set and the ancestor identifiers.

17 Claims, 11 Drawing Sheets

(56) References Cited

U.S. PATENT DOCUMENTS

| | | | |
|---|---|---|---|
| 2005/0108402 | A1 | 5/2005 | Colson et al. |
| 2005/0149621 | A1* | 7/2005 | Kirkland ............... H04L 51/04 709/207 |
| 2006/0271630 | A1 | 11/2006 | Bensky et al. |
| 2007/0282956 | A1* | 12/2007 | Staats ................. G06Q 10/107 709/206 |
| 2009/0044200 | A1 | 2/2009 | Bordia et al. |
| 2009/0176521 | A1 | 7/2009 | Klassen et al. |
| 2009/0254624 | A1 | 10/2009 | Baudin et al. |
| 2010/0167766 | A1 | 7/2010 | Duarte et al. |
| 2010/0293475 | A1 | 11/2010 | Nottingham et al. |
| 2011/0191429 | A1 | 8/2011 | Tu et al. |
| 2011/0196933 | A1* | 8/2011 | Jackson .............. G06Q 10/107 709/206 |
| 2011/0263278 | A1* | 10/2011 | Riddle ................ G06Q 10/107 455/466 |
| 2012/0036197 | A1 | 2/2012 | Bishop |
| 2012/0124146 | A1* | 5/2012 | Hsiao ..................... H04L 51/36 709/206 |
| 2012/0124147 | A1 | 5/2012 | Hamlin et al. |
| 2012/0124483 | A1 | 5/2012 | Zuckerberg et al. |
| 2012/0173243 | A1* | 7/2012 | Anand ................ H04M 3/4936 704/270.1 |
| 2012/0198017 | A1* | 8/2012 | LeVasseur ............. H04L 51/24 709/206 |
| 2012/0221638 | A1 | 8/2012 | Edamadaka et al. |
| 2012/0311055 | A1 | 12/2012 | Adams et al. |
| 2013/0024780 | A1* | 1/2013 | Sutedja ............... G06Q 10/107 715/752 |
| 2013/0091227 | A1 | 4/2013 | Bhakar et al. |
| 2013/0124548 | A1* | 5/2013 | Chhaparia ......... G06F 17/30424 707/758 |
| 2013/0124643 | A1 | 5/2013 | DeLuca et al. |
| 2013/0218885 | A1* | 8/2013 | Satyanarayanan ... G06Q 30/016 707/728 |
| 2013/0290435 | A1* | 10/2013 | Martin ................... H04L 51/28 709/206 |
| 2013/0290436 | A1 | 10/2013 | Martin et al. |
| 2015/0113076 | A1 | 4/2015 | Dubie et al. |
| 2015/0127749 | A1* | 5/2015 | Mishanski ............. H04L 51/16 709/206 |
| 2015/0263995 | A1 | 9/2015 | Mahood et al. |
| 2015/0281143 | A1 | 10/2015 | Wang |
| 2015/0281165 | A1 | 10/2015 | Chao |
| 2016/0021033 | A1 | 1/2016 | Peterson et al. |
| 2017/0034084 | A1 | 2/2017 | Brunsen |

OTHER PUBLICATIONS

Second Written Opinion for International Patent Application No. PCT/US2015/019549, dated Feb. 25, 2016, date of filing: Mar. 10, 2015, 6 pages.

International Preliminary Report on Patentability for International Patent Application No. PCT/US2015/019549, dated Apr. 1, 2016, date of filing: Mar. 10, 2015, 12 pages.

International Search Report and Written Opinion for International Application No. PCT/US2015/019549, dated Jun. 16, 2015, date of filing: Mar. 10, 2015, 10 pages.

Wang, et al., "Recovering Implicit Thread Structure in Newsgroup Style Conversations", In Proceedings of the Second International Conference on Weblogs and Social Media. Mar. 30, 2008, 9 pages.

Joshi, et al., "Auto-Grouping Emails for Faster E-Discovery", In Proceedings of VLDB Endowment, vol. 4, Issue 12, Aug. 29, 2011, 11 pages.

Prosecution History for U.S. Appl. No. 14/209,604 including: Response to Notice to File Missing Parts dated Apr. 10, 2014, Notice to File Missing Parts dated Apr. 4, 2014, Application and Drawings filed Mar. 13, 2014, 61 pages.

International Search Report and Written Opinion for International Application No. PCT/US2015/012326, dated Apr. 21, 2015, date of filing: Jan. 22, 2015, 9 pages.

Wang, et al., "Email Conversations Reconstruction Based on Messages Threading for Multiperson", In International Workshop on Education Technology and Training, and International Workshop on Geoscience and Remote Sensing, vol. 1, Dec. 21, 2008, 5 pages.

International Preliminary Report on Patentability for International Application No. PCT/US2015/012326, dated Oct. 23, 2015, date of filing: Jan. 22, 2015, 19 pages.

Non-Final Office Action for U.S. Appl. No. 14/209,604 dated Dec. 30, 2016, 24 pages.

Final Office Action for U.S. Appl. No. 14/209,604 dated Aug. 17, 2017, 25 pages.

Amendment for U.S. Appl. No. 14/209,604, dated Apr. 27, 2017, 13 pages.

Horowitz, Paul, "Get Notifications for Specific Email Threads in iOS Mail App", Published on: Nov. 13, 2014 Available at: http://osxdaily.com/2014/11/13/enable-notifications-email-thread-ios-mail/.

"International Search Report and Written Opinion Issued in PCT Application No. PCT/US2017/054648", dated Jan. 9, 2018, 12 pages.

Amendment with RCE for U.S. Appl. No. 14/209,604 dated Nov. 15, 2017, 16 pages.

Prosecution History for U.S. Appl. No. 15/286,102 including: Non-Final Office Action dated Mar. 22, 2018 and Application and Drawings filed Oct. 5, 2016, 63 pages.

"Non Final Office Action Issued in U.S. Appl. No. 14/209,604" dated Jun. 1, 2018, 28 Pages.

"Office Action Issued in European Patent Application No. 15704135.1", dated Jul. 27, 2017, 3 Pages.

"First Office Action and Search Report issued in Chinese Patent Application No. 201580008932.3", dated Aug. 30, 2018, 10 Pages.

"Final Office Action Issued in U.S. Appl. No. 15/286,102", dated Sep. 17, 2018, 26 Pages.

* cited by examiner

DERIVING ATOMIC COMMUNICATION THREADS FROM INDEPENDENTLY ADDRESSABLE MESSAGES

BACKGROUND

Computer systems are currently in wide use. Some computer systems include messaging systems by which users can send messages back and forth to one another.

There are a wide variety of different types of messaging systems. They can include, for instance, electronic mail (e-mail) messaging systems, text messaging systems, social network messaging systems, among others. In these types of messaging systems, it is common for a user to send a message to one or more recipients. The recipients can then reply to all of the other recipients, to a subset of those recipients, or add additional recipients. If multiple people reply to the same message, then if a user wishes to respond to each of the messages, the user normally needs to manually aggregate all of the related messages and respond individually to those messages. Also, if a user wants to act on the whole set of messages (for instance, to move the set to a folder) then the user would normally have to act on each individually.

Some systems have attempted to group messages into conversations. However, this normally entails simply grouping sets of messages together based upon their topic. A user who wishes to reply to forked messages in the conversation still normally needs to read and respond to each individual message.

The discussion above is merely provided for general background information and is not intended to be used as an aid in determining the scope of the claimed subject matter.

SUMMARY

When a message is received, the recipient set in the message, as well as ancestor message identifiers, are analyzed. The received message is either placed in an existing thread in a conversation, or in a new thread for the same conversation, based upon the analysis of the recipient set and the ancestor identifiers.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
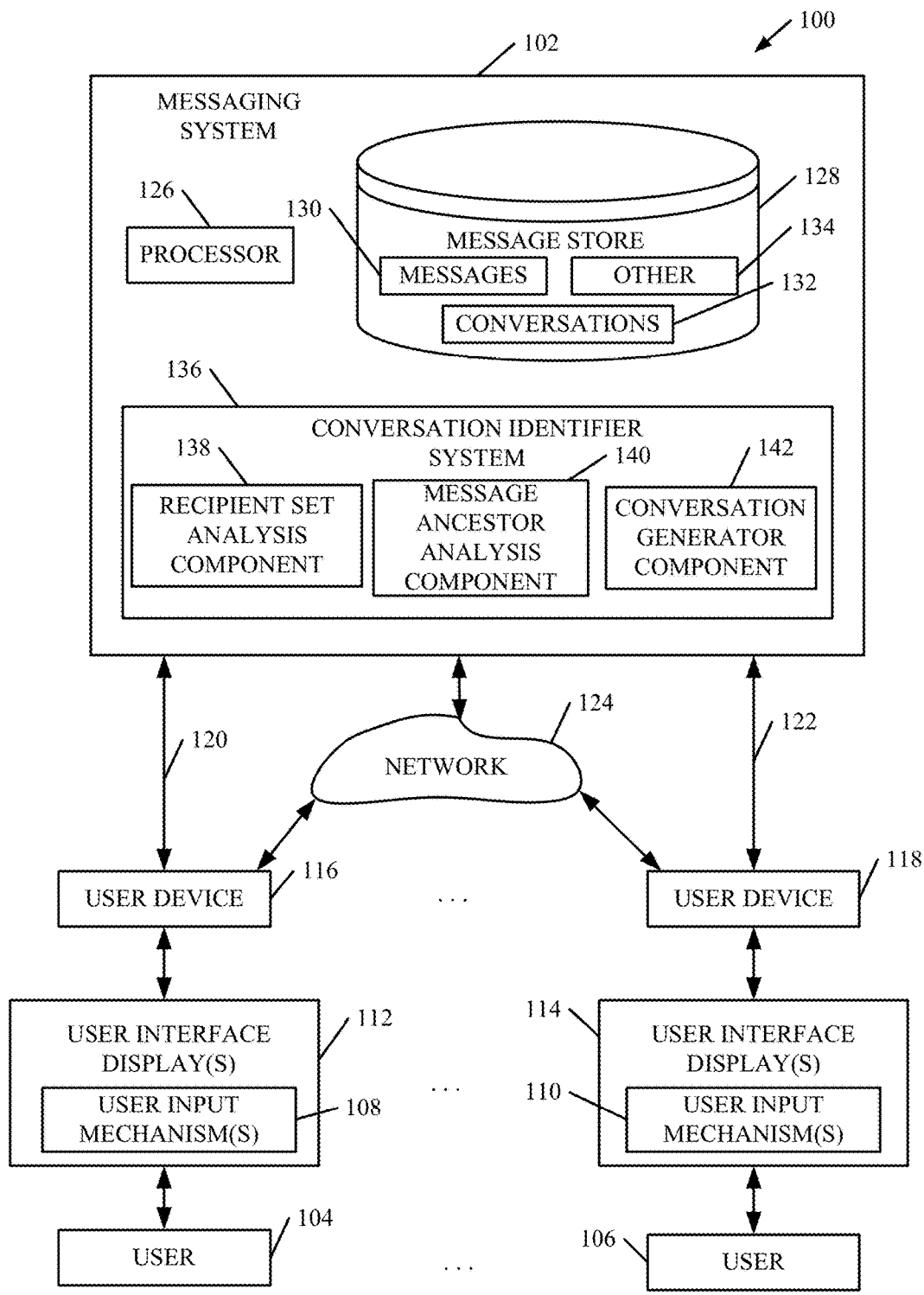
FIG. 1 is a block diagram of one illustrative messaging architecture.

FIG. 1 shows one block diagram of messaging architecture 100. While messaging architecture 100 can be a variety of different types of messaging systems (some of which include instant messaging in real time communications, text messaging systems, social-network messaging systems, etc.), it will be described as an e-mail system for the sake of example.

Also, as used herein, a conversation means a collection of messages that are related by ancestry: for instance, they are directly or indirectly derived-via Reply, Reply All, or Forward-from a common root message. A thread is a collection of messages related by ancestry that share the same set of participants or where the participants grow over time. Threads can be acted on as a unit.

Messaging architecture 100 includes messaging system 102 that is accessed by users 104-106, each of whom illustratively interact with user input mechanisms 108-110 on user interface displays 112-114 that are generated by user devices 116-118. Users 104 and 106 can interact with the user input mechanisms 108 and 110 to generate electronic mail messages, and replies, and send them to one another using messaging system 102. They can also act on messages in other ways as well, such as by placing them in a folder, or in other ways. FIG. 1 also shows that user devices 116-118 can access messaging system 102 either directly (as indicated by arrows 120 and 122), or over network 124. It will also be appreciated that messaging system 102 can be used by many other users as well, but only two users 104-106 are shown for the sake of example.

FIG. 1 further shows that messaging system 102 illustratively includes processor (or server) 126, message store 128, (which, itself, stores messages 130, conversations 132, threads 133 within conversation 132, and can store other information 134 as well). Messaging system 102 also illustratively includes conversation/thread identifier system 136. System 136 illustratively includes recipient set analysis component 138, message ancestor analysis component 140 and conversation/thread generator component 142. It can include other components or systems as well, and those shown in FIG. 1 are shown for the sake of example only.

Messages 130 illustratively include all messages that are sent by the users of messaging system 102. Conversations 132 illustratively include message identifiers that identify various messages 130 that belong to various different conversations. Messages 130 can also belong to a thread 133 within conversation 132. For instance, conversation/thread identifier system 136 illustratively identifies atomic communication threads 133 based on a series of independently addressable messages between users 104 and 106 (and other users). The threads 133 (e.g., within conversations 132) are identified over a message response chain (which can be a collection of message identifiers that indicate relationships between independent messages), as well as a set of recipients for each of the messages.

Figure 2:
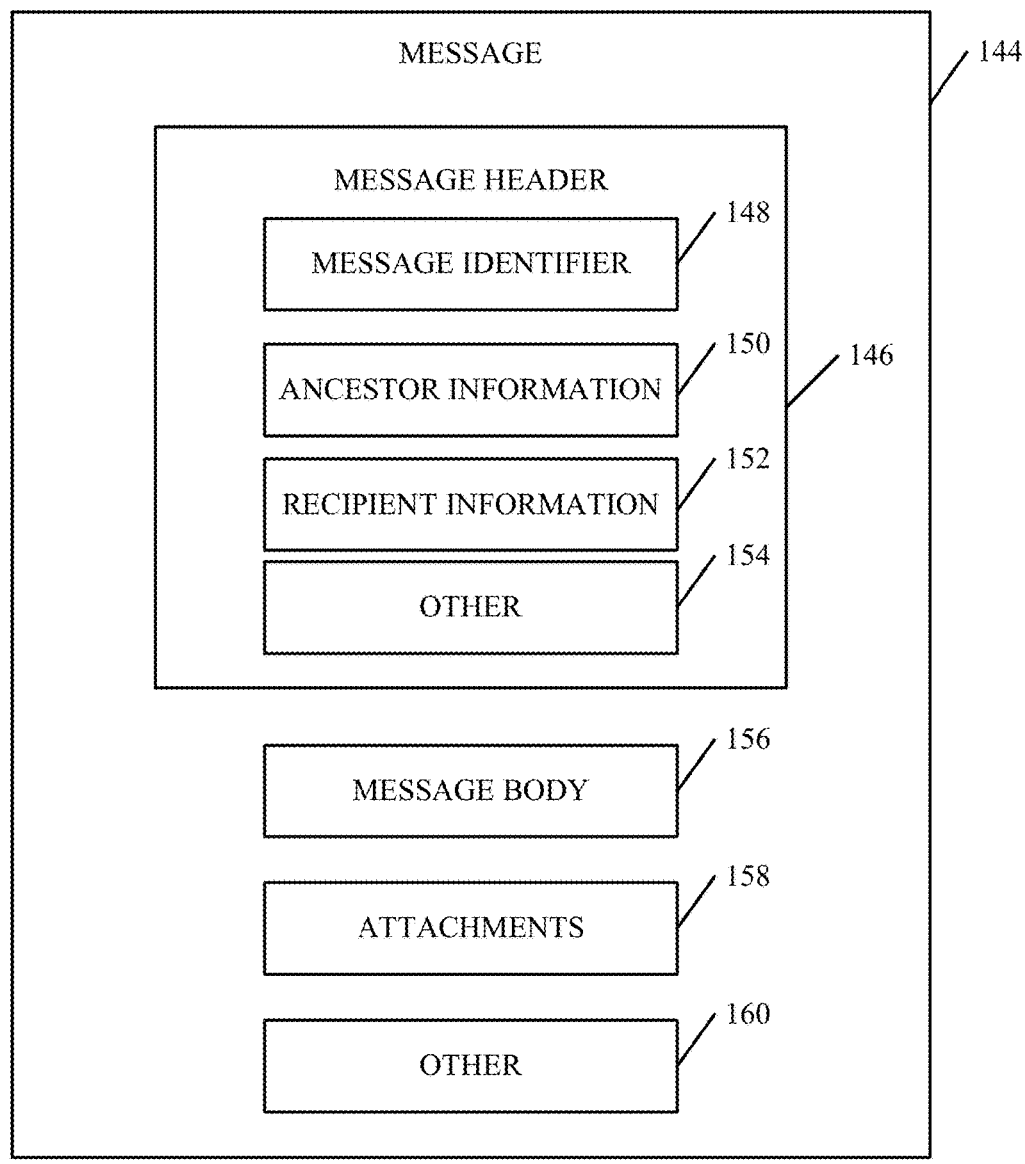
FIG. 2 is a block diagram of one illustrative message that can be sent in the architecture shown in FIG. 1.

FIG. 2 shows one illustrative block diagram of a message 144 that can be sent using messaging system 102. In the embodiment shown in FIG. 2, message 144 illustratively includes header information 146 (which, itself, includes a unique message identifier 148 that uniquely identifies message 144), ancestor information 150 that identifies the ancestor messages to message 144, recipient information 152 that identifies the recipients of message 144, and it can include other information 154 as well. FIG. 2 also shows that message 144 illustratively includes a message body 156 and it can include attachments 158 and other information 160 as well. It will be noted that the messages 144 can include other information as well, such as information identifying that the message was sent on behalf of someone else (e.g., a delegation scenario). In that case, the message will include an identifier that identifies a Sender, as well as a From field, but the person in the Sender field is different than the person in the From field.

In one embodiment, ancestor information 150 is information that includes the message identifier for any ancestor messages to message 144. By ancestor messages, it is meant messages that precede message 144 in an already existing conversation. For instance, if user 104 sends a first message to user 106, and user 106 replies to that message, then if message 144 represents the reply message, ancestor information 150 will identify the first message, to which message 144 is a reply. Further, if a third message is sent that is in reply to message 144, then the ancestor information 150 for the third message will include not only the message identifier for message 144, but also the message identifier for the first message, (the message that message 144 was in reply to). Thus, ancestor information 150 illustratively identifies all messages that precede the present message, in an already-existing conversation.

Before describing the overall operation of messaging system 102 in generating new conversations and new threads and adding messages to existing threads in existing conversations, a brief overview will be provided to enhance understanding. A thread within a conversation is illustratively identified as a collection of messages originating from a common ancestor, in which the set of recipients is the same or grows over time. For instance, when an individual message is received by messaging system 102, the message ancestor analysis component 140 illustratively looks for a parent of the newly received message (which will be a message that the newly received message is directly in reply to). This may be specified as part of the message header 146. If the parent exists, and the recipients of the newly received message are a superset of the recipients in the parent message, then the newly received message is added as part of an existing thread that includes the parent message. If the parent message is not found, or the new recipient set on the newly received message is not a superset of the previous recipients, then a new thread is created and the newly received message is added to the new thread.

Figure 3:
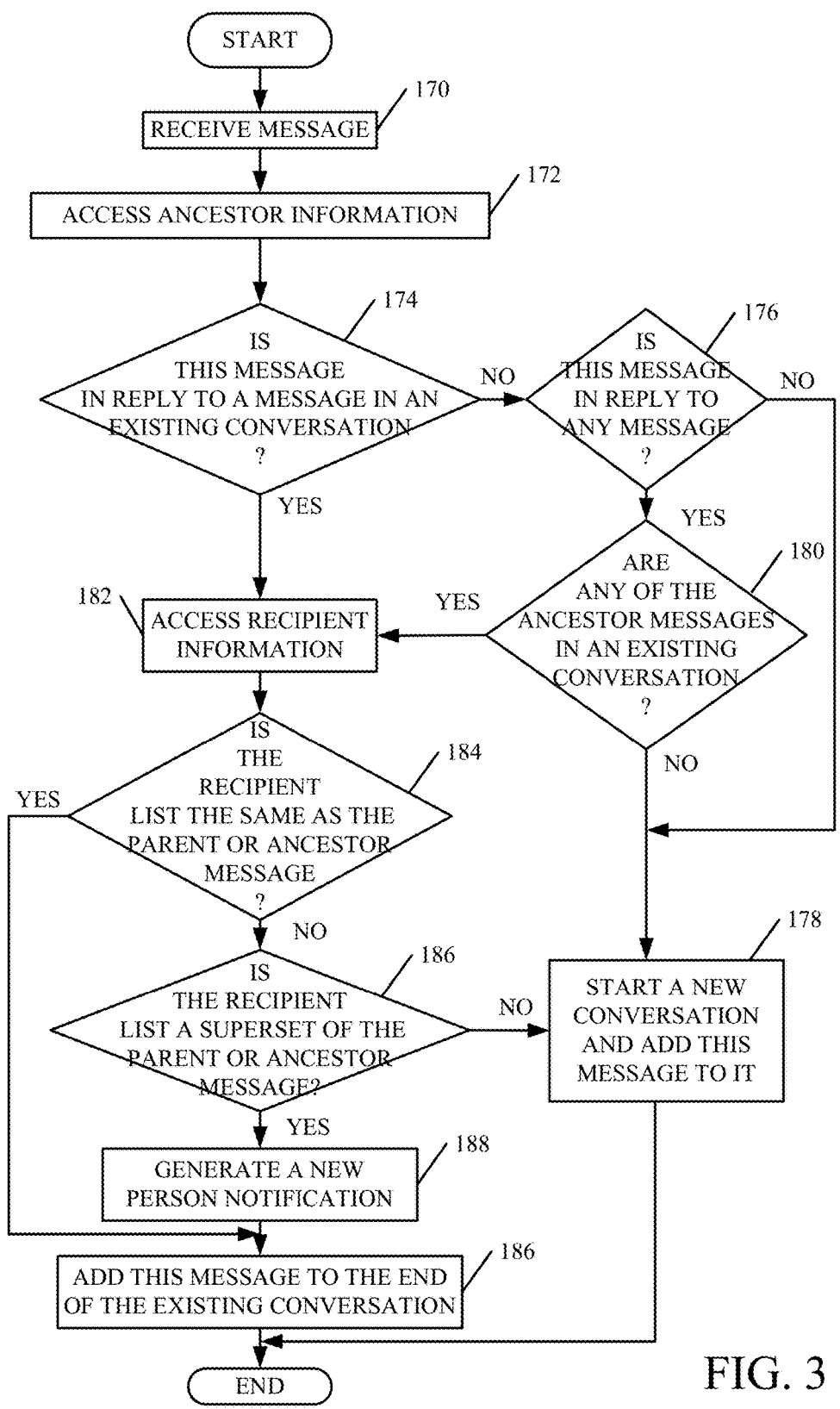
FIG. 3 is a flow diagram illustrating one embodiment of the operation of the architecture shown in FIG. 1 in generating conversations and adding messages to those conversations.

FIG. 3 is a flow diagram illustrating one embodiment of the operation of architecture 100 in generating new conversations and adding new messages to the new conversations and to threads in existing conversations, in more detail. It is first assumed that one of users 104 and 106 generates a message and sends it through messaging system 102. Receiving the message at messaging system 102 is indicated by block 170 in FIG. 3.

Message ancestor analysis component 140 then accesses the ancestor information 150 in the newly received message. This is indicated by block 172. Message ancestor analysis component 140 determines whether the newly received message is in reply to a message in an already existing conversation 132. This is indicated by block 174 in FIG. 3. If not, component 140 determines whether the newly received message is in reply to any message at all. This is indicated by block 176. If the newly received message is not a reply message, then conversation generator component 142 starts a new conversation 132 and stores the newly received message as part of the new conversation in message store 128. This is indicated by block 178 in FIG. 3.

Returning again to block 176, if message ancestor analysis component 140 determines that the newly received message is, in fact, a reply message, then component 140 determines whether any of the ancestor messages identified in the newly received message are also identified as being part of an already existing conversation 132. This is indicated by block 180. If not, this may mean that the newly received message is an out-of-order delivery in an asynchronous messaging system (like email). If that occurs, then even though the newly received is a reply message, it is in reply to a message that is not part of any already-existing conversation. Therefore, again, conversation generator component 142 starts a new conversation and adds the newly received message to it, at block 178.

If, either at block 174 or 180, the parent message to the newly received message, or any of its ancestors, are in an already-existing conversation, then recipient set analysis component 138 accesses the recipient information 152 in the newly received message. This is indicated by block 182 in FIG. 3. If the recipient list in the newly received message is the same as either the parent or ancestor message (whichever was identified in block 174 or block 180, respectively), then the newly received message is simply added to the end of the thread in the already-existing conversation (which the parent message or ancestor message is a part of). This is indicated by blocks 184 and 186 in the flow diagram of FIG. 3.

However, if at block 184, component 138 determines that the recipient list of the newly received message is not the same as that of the parent or ancestor message, then component 138 determines whether the recipient list on the newly received message is a superset of the recipient list on the parent or ancestor message. This is indicated by block 187. If not, then conversation generator component 142 again generates a new thread in the conversation and adds the newly received message to the new thread.

However, if, at block 186, recipient set analysis component 138 determines that the recipient list on the newly received message is, in fact, a superset of the recipients on the parent or ancestor message, then the author of the newly received message has simply added a new recipient to the recipient list. A notification to that effect is added to the record for the newly received message. This is indicated by block 188. The newly received message is then added to the end of the thread in the existing conversation (which the parent or ancestor is a part of), as indicated by block 186.

Figure 4:
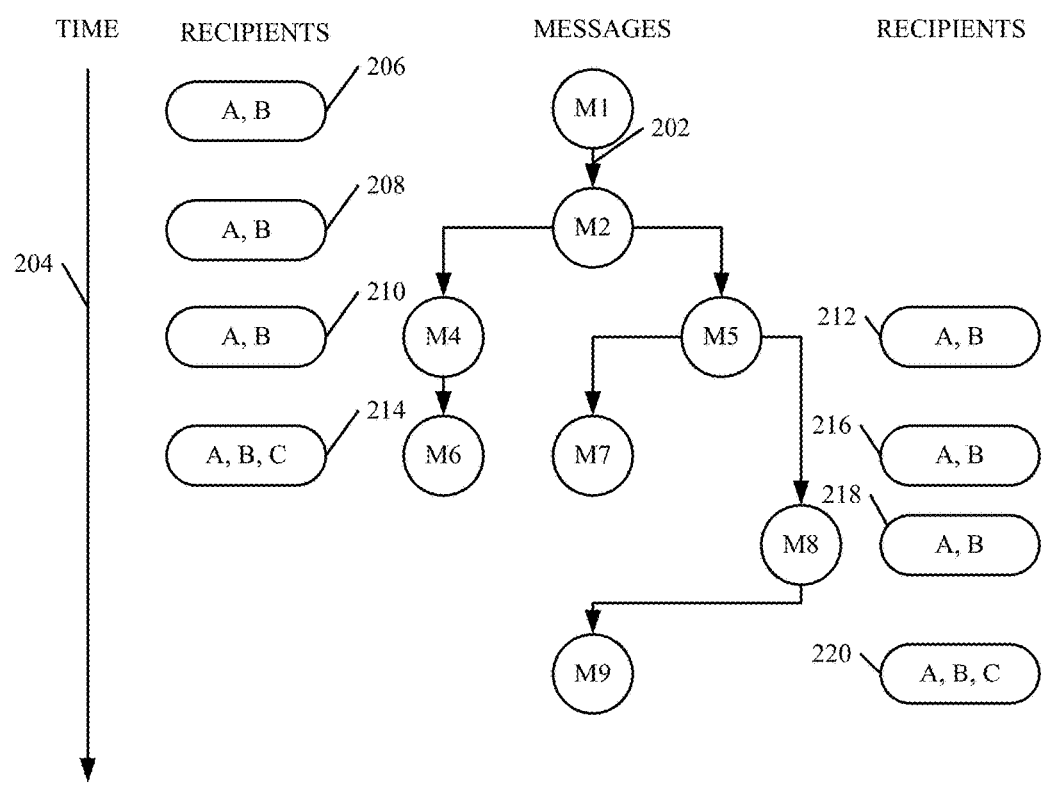
FIG. 4 shows one exemplary set of messages and recipients that can be grouped into a single conversation using the architecture shown in FIG. 1.

An example may be helpful. FIG. 4 is a diagram 200 that shows a set of messages (labeled M1-M9) along with the recipients of those messages, arranged along a timeline 204. An arrow indicates that the message on the outbound end of the arrow is in reply to the message on the originating side of the arrow. For instance, message M1 is connected to message M2 by arrow 202. This indicates that message M2 is in reply to message M1 (e.g., message M1 is the parent of message M2).

Diagram 200 also shows that messages M4 and M5 are both in reply to message M2. Recipient identifiers 206, 208, 210 and 212 show that messages M1, M2, M4 and M5 all have the same recipients (recipients A and B). Diagram 200 shows that message M6 is in reply to message M4, and it has an additional recipient (recipient C), as indicated by message identifier 214.

Diagram 200 also shows that message M7 is in reply to message M5, and it has recipients A and B as indicated by recipient identifier 216. Message M8 is also in reply to message M5 and it has recipients A and B as indicated by identifier 218. Message M9 is in reply to message M8 and it also has a set of recipients A, B and C as indicated by message identifier 220.

By following the flow diagram of FIG. 3, it can be seen that conversation/thread identifier system 136 will identify all of the messages M1-M9 as being part of the same thread in the same conversation. Message M1 is not in reply to any other message that is identified by messaging system 102. Therefore, at block 176 of FIG. 3, it will be determined that a new conversation should be started and message M1 added to it.

Message M2 is in reply to message M1. This will be determined at block 174 of FIG. 3 and, at block 184, it will be determined that the recipients of message M2 are the same as those for message M1. Thus, processing skips to block 186 and message M2 is added to the same thread in the same conversation as message M1.

Message M4 is in response to message M2 and, again, the recipients are the same as for message M2. Thus, message M4 will be added to the same thread in the same conversation as well.

Even though message M5 is a separate reply to message M2 (separate from message M4), the recipients of message M5 are the same as those for message M2. Therefore, message M5 will also be added to the same thread in the same conversation as messages M1, M2 and M4.

Now message M6 is received. It is in response to message M4. This will be identified at block 174. However, at block 184, it will be determined that the recipients (A, B and C) are not that same as those for the parent message M4. Thus, processing will proceed with respect to block 186 in FIG. 3 where it will be determined that the recipients of message M6 are a superset of the recipients of message M4 (that is, message M6 includes all of the recipients of the parent message M4 plus one or more additional recipients). Thus, a new person notification will be added to message M6 at block 188 in FIG. 3, and message M6 will be added to the existing thread in the same conversation which already contains messages M1, M2, M4 and M5.

When message M7 is received, it will be determined that it is in reply to a message that is already part of an existing conversation, and that its recipients are the same as its parent message. Therefore, it will be added to the same thread in the existing conversation that includes messages M1, M2, M4, M5 and M6. The same is true of message M8.

Now, when message M9 is received, it will be determined that it is in response to message M8, which is already part of an existing conversation, at block 174. At block 184, it will be determined that the recipients of message M9 are not the same as those of its parent, but at block 186 it will be determined that they are a superset of those in the parent. Thus, message M9 will be added to the same thread in the same conversation as well.

It can thus be seen that, using conventional message grouping techniques, the messages shown in FIG. 4 would have several forks (where more than one person replied to the same message) that a user would have to deal with. However, using the conversation/thread identifier system 136, they are all grouped into a common thread in the same conversation, and can be acted on collectively.

It will also be appreciated, however, that the present system also maintains confidentiality. For instance, if one of the messages only had a subset of the recipients of its parents, it would not be added to the thread in the already-existing conversation, even though its parent was in that thread and conversation. This is because a user may intend to only send certain information to a subset of the members of a given conversation. In that case, at block 186, a new conversation and/or thread would be started and the newly received message would be added to the new conversation and/or thread. However, as shown in FIG. 4, because all of the messages in M1-M9 are part of the same thread in the same conversation, when anyone replies to any of those messages, so long as the recipients of the reply are either the same as, or a superset of, the recipients of the parent or ancestor messages (whichever is identified), then everyone in that thread will get the reply, even if it is not in a direct chain of descendency from all of the messages in the thread. That is, the messages derive from the same root, but are not necessarily in the same linear chain.

By way of example, it can be seen that message M8 is in reply to message M5, and message M8 only has recipients A and B. However, because message M8 is part of the thread and conversation that all the other messages are in, recipient C will also be able to see message M8. This allows the sender of message M8 to respond to all of the recipients in the conversation, without selecting and responding to independently addressable messages in the conversation.

The present discussion has mentioned processors and/or servers. In one embodiment, the processors and servers include computer processors with associated memory and timing circuitry, not separately shown. They are functional parts of the systems or devices to which they belong and are activated by, and facilitate the functionality of, the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 5:
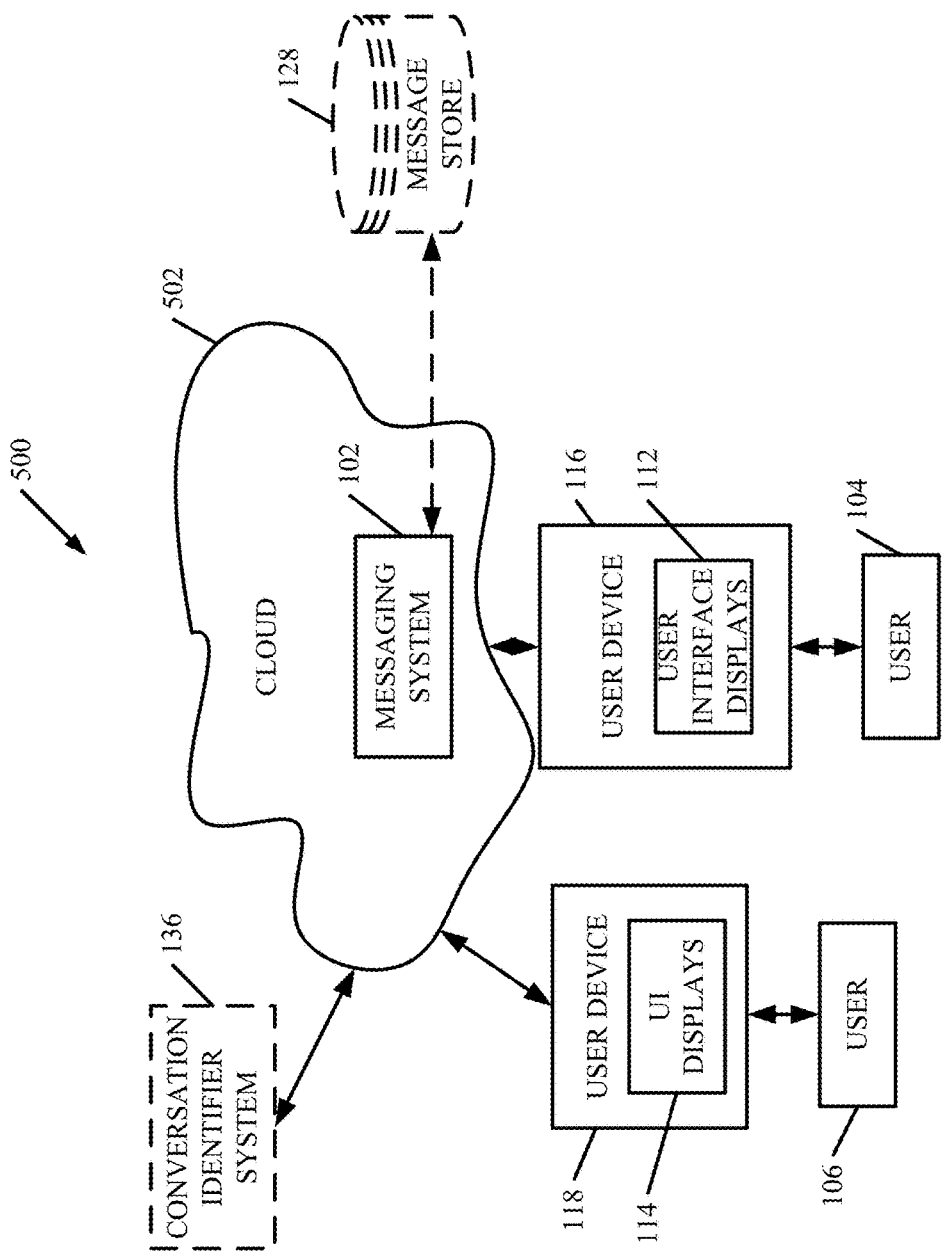
FIG. 5 shows one embodiment of the architecture shown in FIG. 1, deployed in a cloud computing architecture.

FIG. 5 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the embodiment shown in FIG. 5, some items are similar to those shown in FIG. 1 and they are similarly numbered. FIG. 5 specifically shows that messaging system 102 is located in cloud 502 (which can be public, private, or a combination where portions are public while others are private). Therefore, users 104-106 use user devices 116-118 to access messaging system 102 through cloud 502.

FIG. 5 also depicts another embodiment of a cloud architecture. FIG. 5 shows that it is also contemplated that some elements of system 102 are disposed in cloud 502 while others are not. By way of example, data store 128 can be disposed outside of cloud 502, and accessed through cloud 502. In another embodiment, conversation identifier system 136 is also outside of cloud 502. Regardless of where they are located, they can be accessed directly by devices 116-118, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 6:
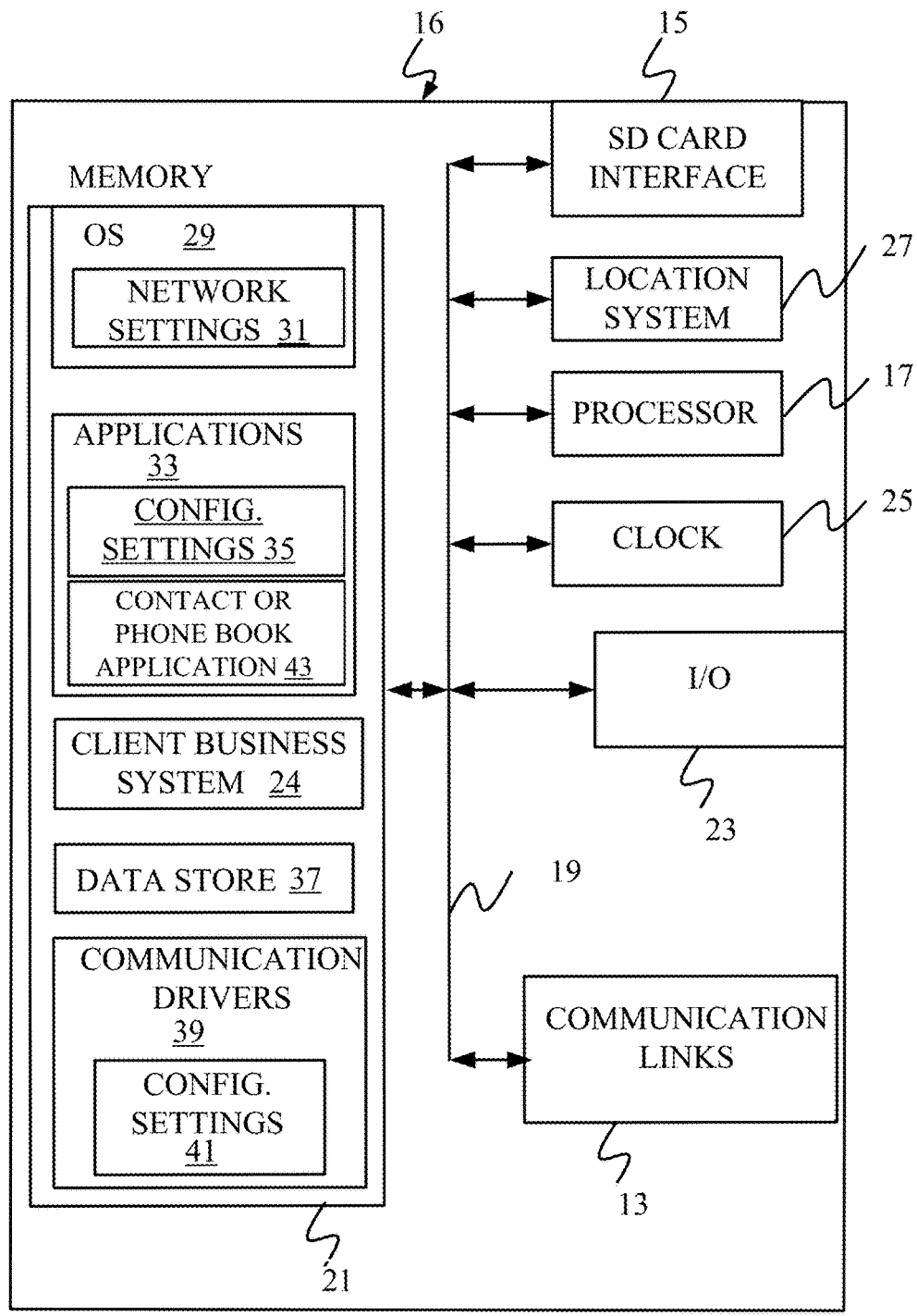
FIGS. 6-10 illustrate various examples of mobile devices that can be used by users in the architecture shown in FIG. 1.

FIG. 6 is a simplified block diagram of one illustrative embodiment of a handheld or mobile computing device that can be used as a user's or client's hand held device 16, in which the present system (or parts of it) can be deployed, or which can comprise user devices 116-118. FIGS. 7-10 are examples of handheld or mobile devices.

FIG. 6 provides a general block diagram of the components of a client device 16 that can run components of architecture 100 or that interacts with architecture 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as 802.11 and 802.11b (Wi-Fi) protocols, and Bluetooth protocol, which provide local wireless connections to networks.

Under other embodiments, applications or systems are received on a removable Secure Digital (SD) card that is connected to a SD card interface 15. SD card interface 15 and communication links 13 communicate with a processor 17 (which can also embody processor 126 from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

Figure 7:
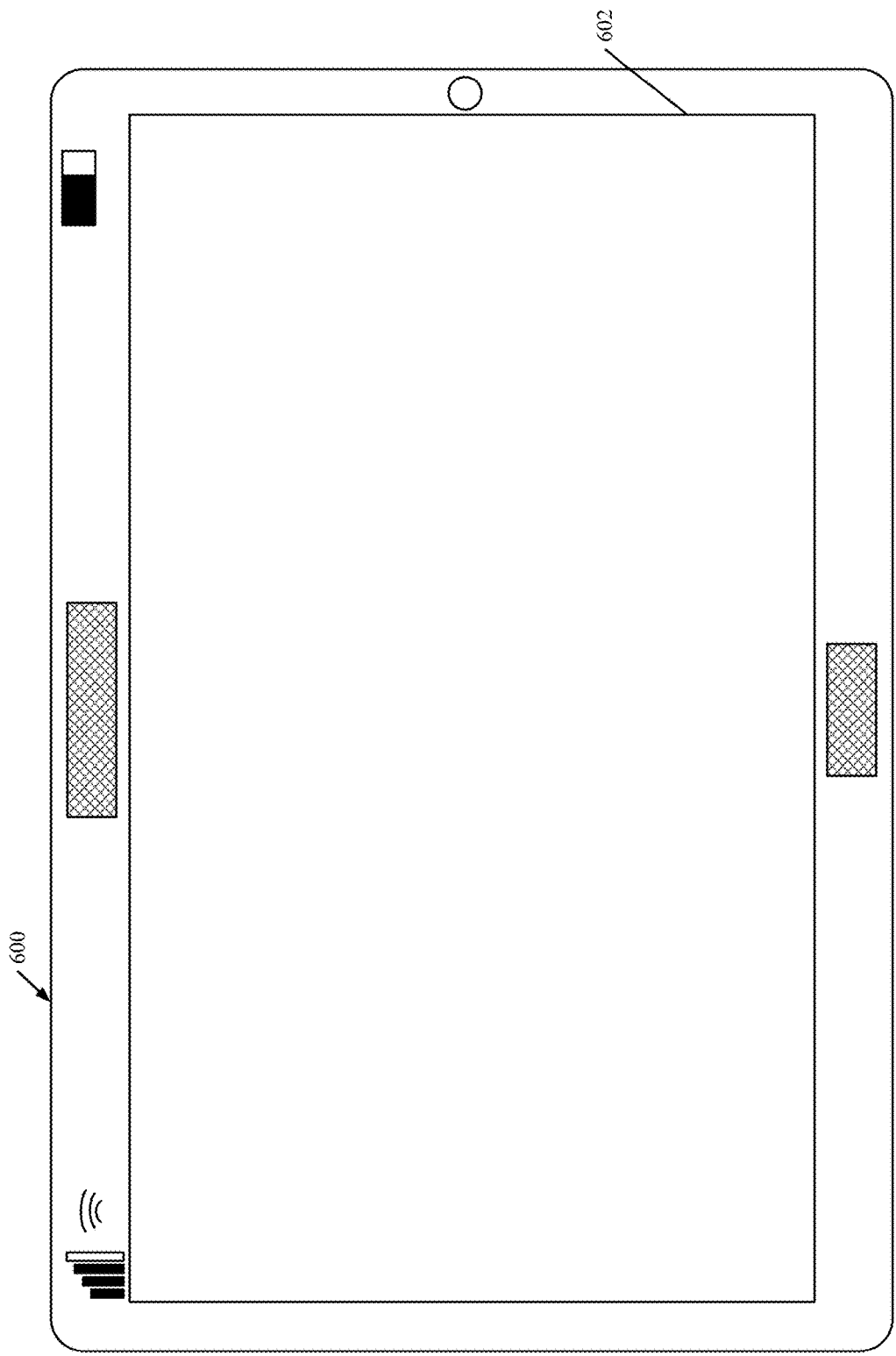

FIG. 7 shows one embodiment in which device 16 is a tablet computer 600. In FIG. 6, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Figure 8:
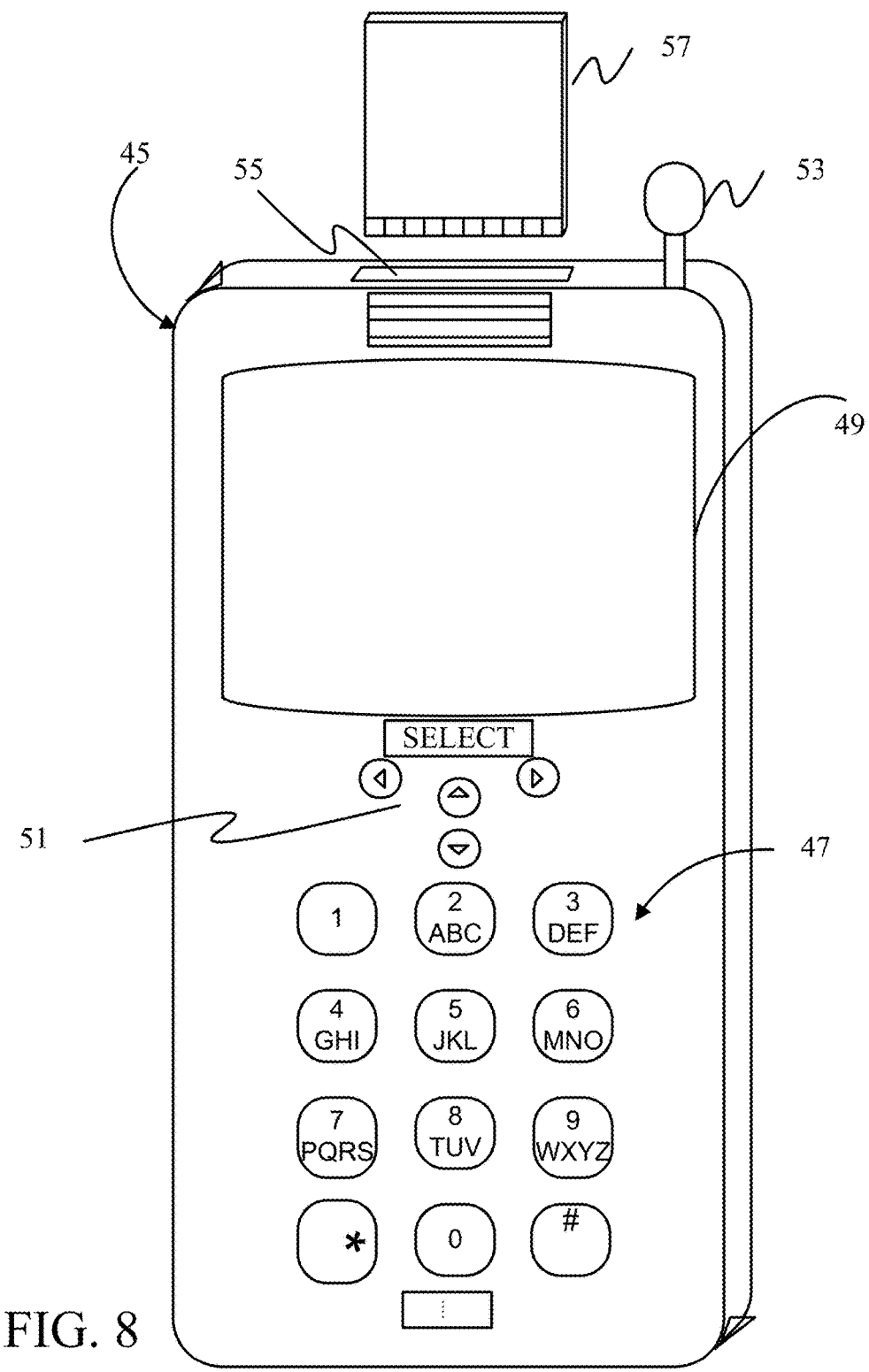
Figure 9:
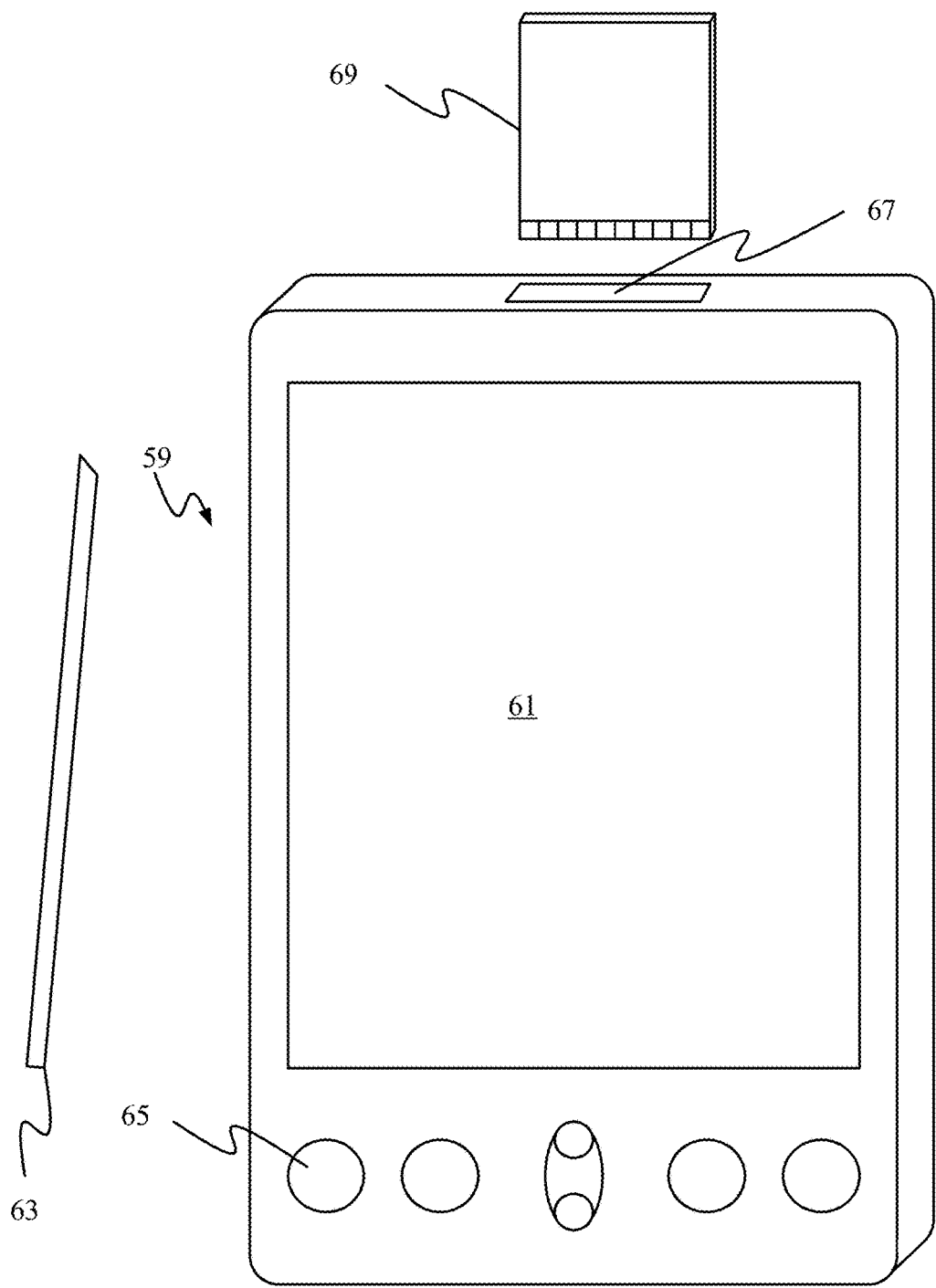

FIGS. 8 and 9 provide additional examples of devices 16 that can be used, although others can be used as well. In FIG. 8, a feature phone, smart phone or mobile phone 45 is provided as the device 16. Phone 45 includes a set of keypads 47 for dialing phone numbers, a display 49 capable of displaying images including application images, icons, web pages, photographs, and video, and control buttons 51 for selecting items shown on the display. The phone includes an antenna 53 for receiving cellular phone signals such as General Packet Radio Service (GPRS) and 1Xrtt, and Short Message Service (SMS) signals. In some embodiments, phone 45 also includes a Secure Digital (SD) card slot 55 that accepts a SD card 57.

The mobile device of FIG. 9 is a personal digital assistant (PDA) 59 or a multimedia player or a tablet computing device, etc. (hereinafter referred to as PDA 59). PDA 59 includes an inductive screen 61 that senses the position of a stylus 63 (or other pointers, such as a user's finger) when the stylus is positioned over the screen. This allows the user to select, highlight, and move items on the screen as well as draw and write. PDA 59 also includes a number of user input keys or buttons (such as button 65) which allow the user to scroll through menu options or other display options which are displayed on display 61, and allow the user to change applications or select user input functions, without contacting display 61. Although not shown, PDA 59 can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections. In one embodiment, mobile device 59 also includes a SD card slot 67 that accepts a SD card 69.

Figure 10:
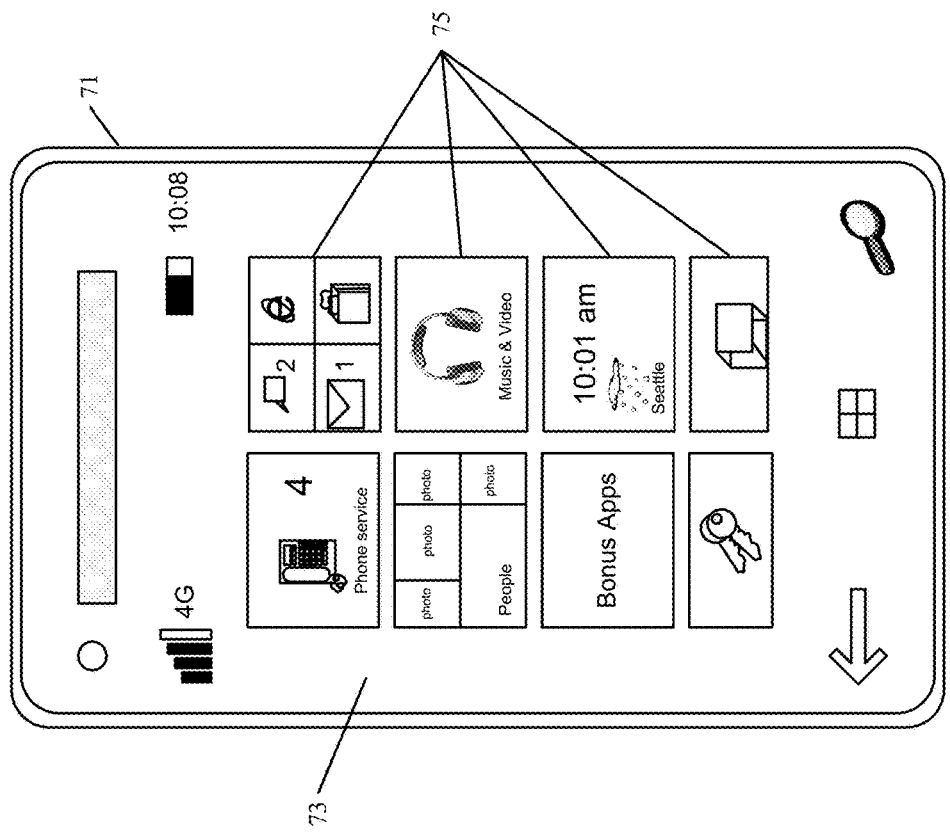

FIG. 10 is similar to FIG. 8 except that the phone is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 11:
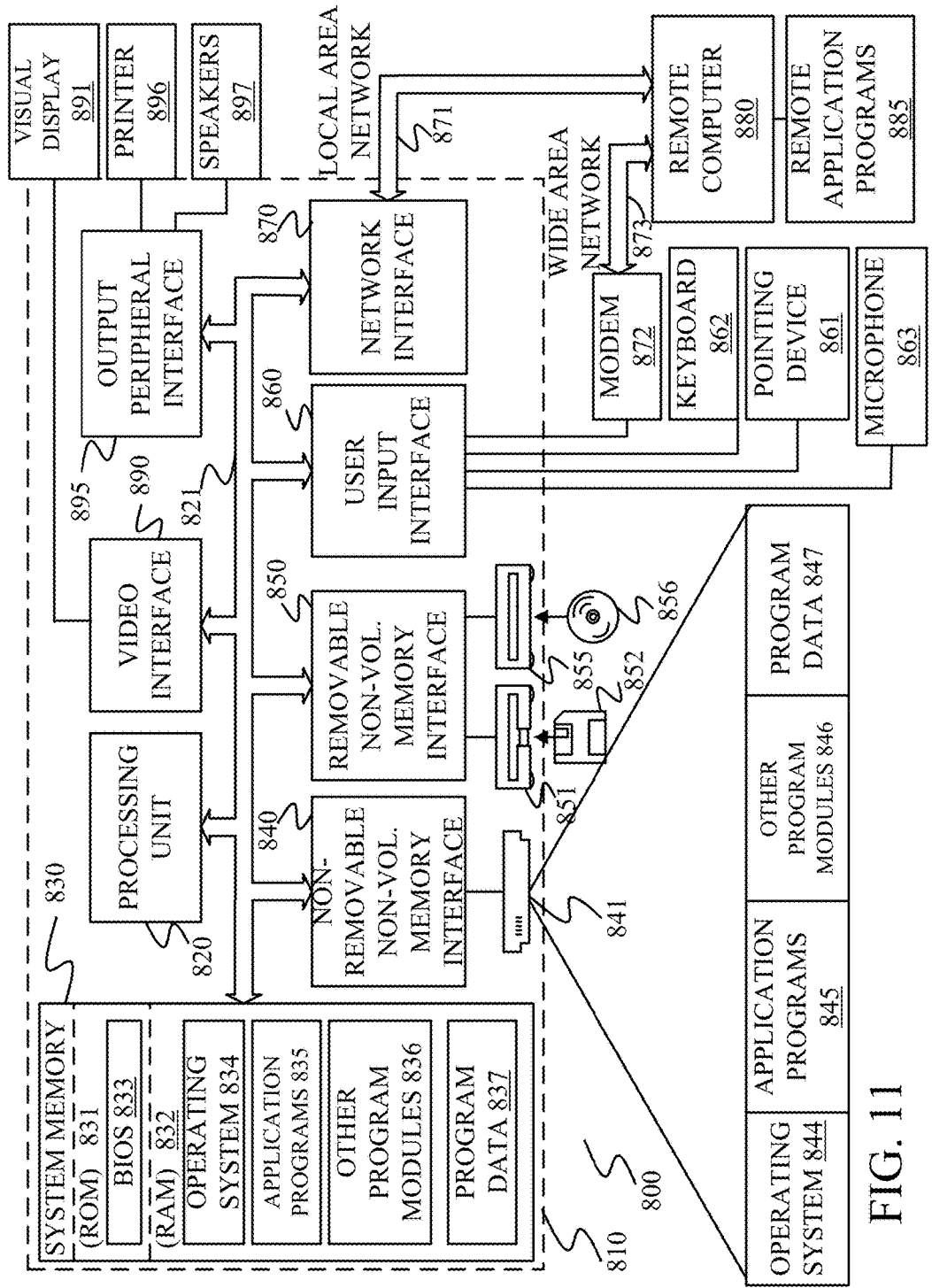
FIG. 11 is a block diagram of one illustrative computing environment.

FIG. 11 is one embodiment of a computing environment in which architecture 100, or parts of it, (for example) can be deployed. With reference to FIG. 11, an exemplary system for implementing some embodiments includes a general-purpose computing device in the form of a computer 810. Components of computer 810 may include, but are not limited to, a processing unit 820 (which can comprise processor 126), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 11.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 11 illustrates operating system 834, application programs 835, other program modules 836, and program data 837.

The computer 810 may also include other removable/non-removable volatile/nonvolatile computer storage media. By way of example only, FIG. 11 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 11, provide storage of computer readable instructions, data structures, program modules and other data for the computer 810. In FIG. 11, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 11 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 11 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method performed by a computing system, the method comprising:
   receiving an electronic message; and
   based on receiving the electronic message:
      identifying, an ancestor message that precedes the received electronic message, wherein the received electronic message comprises a reply to the ancestor message;
      based on ancestor message information corresponding to the ancestor message:
         identifying a conversation that is associated with the ancestor message and includes a set of messages, wherein the conversation comprises a plurality of threads, each thread having a subset of messages that includes some, but not all, of the set of messages in the conversation,
            wherein each thread is actionable as a single communication unit separate from messages in another one of the threads, and
         identifying a first set of recipients that received the ancestor message:
      identifying a second set of recipients that received the received electronic message: and
      in response to determining that the second set of recipients is a superset that includes all of the recipients in the first, set of recipients and at least one additional recipient,
         identifying a particular one of the threads in the conversation that includes the ancestor message,
         automatically adding the received message to the particular thread in the conversation, and
         rendering a representation of the particular thread to a recipient in the second set of recipients; and
      in response to determining that the second set of recipients includes less than all of the recipients in the first set of recipients:
         automatically creating a new thread in the conversation,
         automatically adding the received electronic message to the new thread, and
         generating a display of the new thread.

2. The method of claim 1 and further comprising:
   receiving a second electronic message;
   identifying a third set of recipients that received the second electronic message; and
   based on determining that the third set of recipients is a superset of the first set of recipients,
      identifying a particular one of the threads in the conversation that includes the ancestor message,
      automatically adding the second electronic message to the particular thread in the conversation, and
      rendering a representation of the particular thread to a recipient in the third set of recipients.

3. The method of claim 1 and further comprising;
receiving a second electronic message;
based on determining that the second electronic message is not a reply to an ancestor message, starting a new conversation in the messaging system and adding the second electronic message to the new conversation.

4. The method of claim 1 and further comprising:
receiving a second electronic message;
based, on determining that the second electronic message is not associated with an ancestor message in an already-existing conversation, automatically starting a new conversation in the messaging system and adding the second electronic message to the new conversation.

5. An electronic messaging system, comprising;
a processor; and
memory, storing instructions executable by the processor, wherein the instructions configure the electronic messaging system to provide:
  a message ancestor analysis component configured to:
    identify a second message that comprises a reply to a first, ancestor message, and
    based on ancestor message information corresponding to the ancestor message, identify a conversation that is associated with the ancestor message and includes a set of messages, wherein the conversation comprises a plurality of threads, each thread having a subset of messages that includes some, but not all, of the set of messages in the conversation, and wherein each thread is actionable as a single communication unit separate front messages in another one of the threads; and
  a recipient set analysis component configured to:
    receive an indication of a first set of recipients that received the ancestor message and a second set of recipients that received the second message; and
  a conversation generator component configured to;
    in response to a determination that the second set of recipients is a superset that includes all of the recipients in the first set of recipients and at least one additional recipient,
      identify a particular one of the threads in the conversation that includes the ancestor message,
      automatically add the received message to the particular thread in the conversation, and
      render a representation of the particular thread to a recipient in the second set of recipients; and
    in response to determining that the second set of recipients includes less than all of the recipients in the first set of recipients,
      automatically create a new thread in the conversation,
      automatically add the second message to the new thread, and
      render a representation of the new thread to a recipient in the second set of recipients.

6. The electronic messaging system of claim 5 wherein the set of messages in the conversation derive from a common root message.

7. The electronic messaging system of claim 5 wherein each respective thread includes a subset of the messages in the conversation that share a same set of recipients, and wherein the same set of recipients is maintained or grows during addition of one or more subsequent messages to the respective thread.

8. The electronic messaging system of claim 5 wherein the conversation generator component is configured to:
  if no ancestor message is identified,
    start a new conversation in the messaging system and add the second message to the new conversation.

9. The electronic messaging system of claim 5 wherein the recipient set analysis component is configured to generate a new recipient notification for the second message, based on determining that the second set of recipients includes all of the recipients in the first set in addition to the at least one additional recipient that was not included in the first set of recipients.

10. The electronic messaging system of claim 5 and further comprising;
  a message store configured to store the second message and prior received messages and conversations, each conversation including message identifiers for messages that are part of the conversation.

11. A computing system comprising:
a processor; and
memory storing instructions executable b the processor, wherein the instructions configure the computing system to:
  receive an e-mail message;
  in response to receiving the e-mail message:
    access ancestor message information for an ancestor message that precedes the received e-mail message;
    based on the ancestor message information,
      identify an already-existing conversation in an e-mail messaging system, the already-existing conversation being associated with the ancestor message and including a set of messages in a plurality of threads, wherein each thread
        has a subset of messages that includes some, but not all, of the set of messages in the conversation, and
        is actionable as a single communication unit separate from messages in another one of the threads; and
      identify a first set of recipients that received the ancestor message;
    identify a second set of recipients that received the received e-mail message;
    based on determining that the second set of recipients is a superset that includes all of the recipients in the first set of recipients and at least one additional recipient:
      automatically select a particular one of the threads that includes the ancestor message, and wherein each message in the particular thread has at least all recipients included in second set of recipients,
      automatically add the received e-mail message to the selected thread, and
      generate a representation of the selected thread that includes a representation of the received e-mail message and is displayed to a recipient of the received e-mail message; and
    based on determining that the second set of recipients includes less than all of the recipients in the first set of recipients,
      automatically create a new thread,
      automatically add the received e-mail message to the new thread, and
      render a representation of the new thread to a recipient in the second set of recipients.

12. The computing system of claim 11, wherein the instructions further configure the computing system to:

start a new conversation in the messaging system and add the received e-mail message to the new conversation if no ancestor message is identified in the e-mail messaging, system.

13. The computing system of claim 11, wherein the instructions further configure the computing system to:
based on determining that the second set of recipients includes less than all recipients in the first set of recipients, start a new conversation and add the received e-mail message to the new conversation.

14. The computing system of claim 11, wherein the instructions configure the computing system to:
generate a new recipient notification for the received e-mail message if the second set of recipients has at least one additional recipient in addition to the first set of recipients.

15. The computing system of claim 14 wherein the instructions further configure the computing system to:
identify the received e-mail message as being directly in reply to the ancestor message.

16. The method of claim 2, further comprising:
providing the additional recipient access to the particular thread, including each message in a subset of messages in the particular thread.

17. The electronic messaging system of claim 5, wherein the conversation generator component is further configured to:
identify a subsequent message, wherein the subsequent message is received in reply to the second message;
add the subsequent message to the particular thread; and
automatically provide the first and second sets of recipients access to the subsequent message in the particular thread.

* * * * *